United States Patent

Sasaki

[11] Patent Number: 5,914,715
[45] Date of Patent: Jun. 22, 1999

[54] ANALYTICAL DATA DISPLAY METHOD AND APPARATUS

[75] Inventor: Toyoshige Sasaki, Yokohama, Japan

[73] Assignee: Canon Kabushiki Kaisha, Tokyo, Japan

[21] Appl. No.: 08/636,499

[22] Filed: Apr. 23, 1996

[30] Foreign Application Priority Data

Apr. 27, 1995 [JP] Japan .................................. 7-103970

[51] Int. Cl.$^6$ .................................................. G06F 15/00
[52] U.S. Cl. ......................................... 345/343; 345/340
[58] Field of Search ................................ 345/440, 427, 345/419, 326–354

[56] References Cited

U.S. PATENT DOCUMENTS

| | | | |
|---|---|---|---|
| 4,658,284 | 4/1987 | Kawamura et al. | 358/11 |
| 5,375,201 | 12/1994 | Davoust | 707/503 |
| 5,533,183 | 7/1996 | Henderson, Jr. et al. | 345/344 |
| 5,544,066 | 8/1996 | Rostoker et al. | 364/489 |
| 5,550,964 | 8/1996 | Davoust | 345/440 |
| 5,596,690 | 1/1997 | Store et al. | 345/433 |
| 5,729,704 | 3/1998 | Store et al. | 345/433 |

FOREIGN PATENT DOCUMENTS

| | | | |
|---|---|---|---|
| 0 328 357 | 8/1989 | European Pat. Off. | H04N 13/04 |
| 0 558 224 | 9/1993 | European Pat. Off. | G06F 3/033 |
| 0 561 241 | 9/1993 | European Pat. Off. | G06F 15/40 |
| 0 588 224 | 9/1993 | European Pat. Off. | G06F 3/033 |
| 2237486 | 5/1991 | United Kingdom | G06F 3/033 |
| WO 95/29463 | 11/1995 | WIPO | G06T 11/60 |

OTHER PUBLICATIONS

"Method for Automatic Labeling of a Pie Chart that is Created From a Multi–Component Chart", IBM Technical Disclosure Bulletin, pp. 1–5 (Oct. 1985).

R. Haimes, et al., "Visualization in Computational Fluid Dynamics: A Case Study", Proceedings of the Annual Conference on Visualization, pp. 392–397 (Oct. 22, 1991).

"STATISTICA/W" Software, p. 95, BYTE (Jun. 1994).

*Primary Examiner*—Stephen P. Sax
*Attorney, Agent, or Firm*—Fitzpatrick, Cella, Harper & Scinto

[57] ABSTRACT

Provided are an analytical data display method and apparatus in which the user can readily define a plurality of windows and an analytical model or analytical results can be graphically displayed in each window, thereby making it possible to change the position and size at will, and in which a number of analytical models or analytical results can be readily arranged through a simple operation. A display screen is provided with a plurality of independent windows and identical analytical models or analytical results are graphically displayed from different viewpoints in respective ones of the plurality of independent windows. A layout designation window is provided for designating the layout of a plurality of the graphics display windows. The layout designation window is subdivided into a plurality of areas, and the plurality of areas and respective ones of the plurality of graphics display windows are correlated. As a result, graphics displayed in the graphics display windows are arranged and outputted based upon the layout designation window.

12 Claims, 10 Drawing Sheets

| DISPLAY WINDOW NO. 55a | ANALYTICAL DATA POINTER 55b | VIEWPOINT DATA POINTER 55c | ON/OFF 55d | OTHER FLAGS 55e |
|---|---|---|---|---|
| 1 | a | a1 | ON | |
| 2 | a | a2 | OFF | |
| 3 | a | a3 | OFF | |
| ----- | ----- | ----- | ----- | ----- |

ANALYTICAL DATA DISPLAY METHOD AND APPARATUS

BACKGROUND OF THE INVENTION

This invention relates broadly to a method and apparatus for displaying input/output data of an analytical program. More specifically, the invention relates to an analytical data display method and apparatus for graphically displaying a plurality of analytical models and analytical results on a single display screen.

The recent improvement in the performance of computers has been accompanied by widespread numerical experimentation, which is centered on the finite element method, as one means of performing design, and the importance of such experimentation is growing year by year. In terms also of the content of numerical experiments, there has been a shift from conventional two-dimensional analysis to four-dimensional analysis, which includes the three dimensions and a time axis as well. It has now become possible to analyze actual phenomena as is.

Thus, increasingly complex numerical experimentation has become possible, and this has been accompanied by an enormous increase in input/output data. In particular, in the case of a discrete solution centered on the finite element method, enormous subdivision of elements is required because of the nature of this solution, an analysis of several hundred thousand elements has become ordinary. In recent years, therefore, it becomes essential to create these data and display results using computer graphics. A designer studies the output figures created using computer graphics and reflects these in the design.

At the stage at which the designer studies the results of computation, there are often cases where the designer wishes to scrutinize output graphics from various angles. In other words, it often becomes necessary to display several drawing plans simultaneously side by side and compare them. If structural analysis of a model having a three-dimensional shape is taken as an example, ascertaining the state of deformation and the state of stress distribution is fundamental. To accomplish this, it is necessary that a deformation drawing, arrow drawing and contour-line drawing displaying these states be laid out side by side as drawing plans observed from various angles obtained by changing the point of view, the display area, etc.

In the prior art, there are two methods of laying out a plurality of plans side by side. The first method involves making hard copies of plans displayed on a graphics display (hereinafter referred to simply as a "display") and scrutinizing the hard copies side by side. This method is a primitive one. However, if the plan outputted on the hard copy takes up the full screen, it will not matter if the resolution of the hard copy apparatus is somewhat low. The second method entails displaying a plurality of plans on a display simultaneously. Since hard copies are not made, the plans can be compared and studied in a short period of time and the cost involved is low. However, since the individual plans are small, difficulties are encountered when a low-resolution display is used. Nevertheless, most modern displays have the resolution needed and most analytical data display apparatus presently available make it possible to freely select the number of plans that can be displayed on the display.

In a display apparatus capable of displaying a plurality of plans on a display screen, it is necessary that the display screen have a section for entering instructions on the screen and a section for displaying messages. Since these sections are displayed on the display at the same time, the area which displays the plans becomes even smaller. Recently, many of these display apparatus have come to employ a window system typified by the X Window System. The X Window System was developed at the Massachusetts Institute of Technology as basic means for realizing a GUI (graphical user interface) at a UNIX workstation. The system was made generally available as Version 10 in 1986. Version 11, which was a great improvement on earlier problems and featured extended functionality, was released in 1987. At present, Version 11 has solidified its standing as the industrial standard. The details of X Windows are described in "X-Window Ver. 11 Programming" [Nikkan Kogyo Shimbunsha (1989)]. One advantage of X Windows is that the following excellent user-interface features below can be provided.

(1) A plurality of windows can be created freely and individual windows can be used independently as if they were each a single display device.

(2) It is easy to create and erase windows.

(3) The positions and sizes of windows can be changed at will.

(4) It is possible to display a plurality of windows in superimposed form and to change the manner in which they are superimposed.

(5) Basic drawing functions for points, lines, rectangles, circular arcs and polygons are furnished.

These advantages are the reasons why the windows system is used in display apparatus for displaying analytical data.

Figure 4:
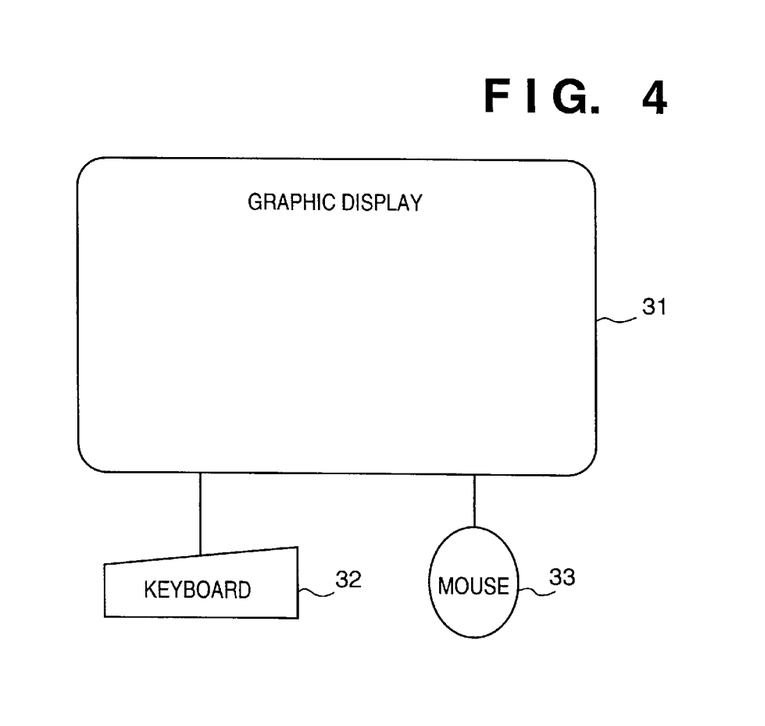
FIG. 4 is a diagram showing the construction of a user interface in an analytical data display apparatus according to this embodiment.

FIG. 4 illustrates the construction of a user interface in an analytical data display apparatus using the X Windows System. As shown in FIG. 4, the apparatus includes a graphic display 31, a keyboard 32 and a mouse 33. The user enters instructions using the keyboard 32 or mouse 33 and displays drawing plans on the graphic display 31.

Figure 5:
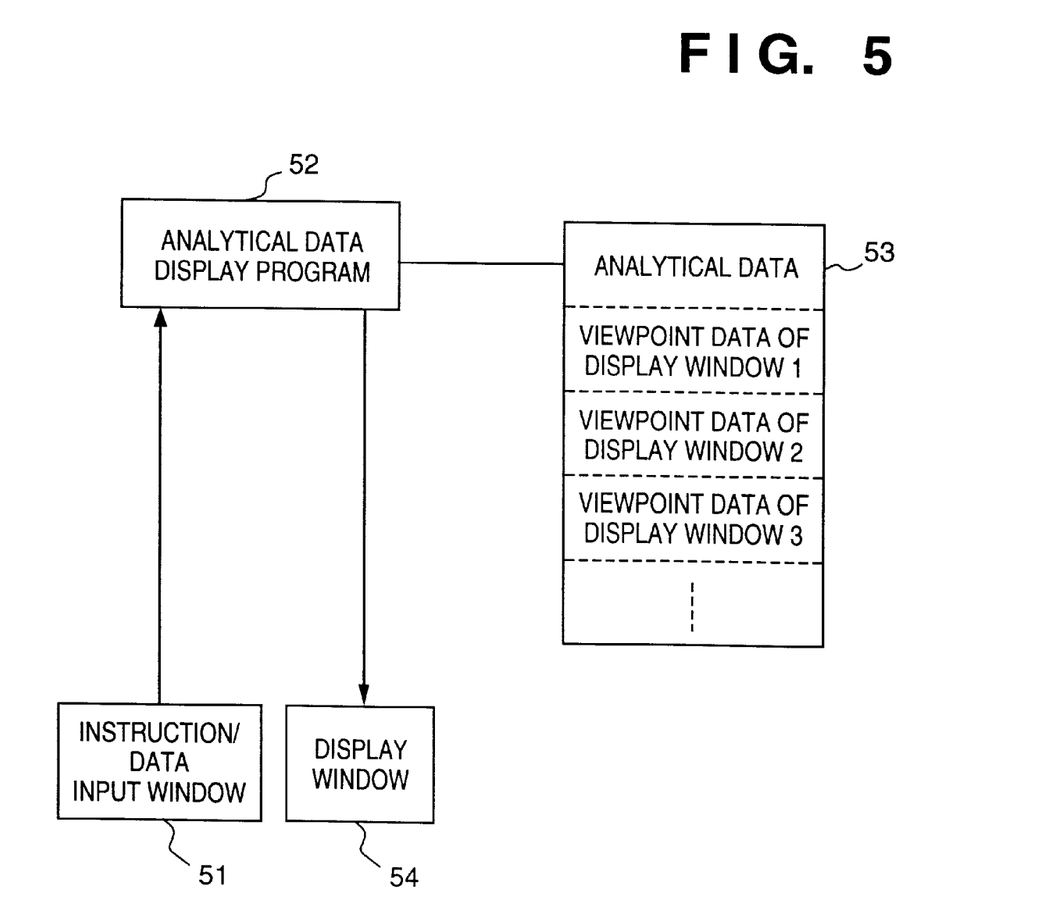
FIG. 5 is a diagram showing the arrangement of a program, data and windows in an analytical data display apparatus according to the prior art.

FIG. 5 illustrates the arrangement of a program, data and windows in the apparatus of FIG. 4. A program section 52 and a data section 53 are stored in the memory of a computer. Windows 51, 54 allow user input/output and are displayed on the graphic display 31. Instructions and data from the user are entered by the keyboard 32 and mouse 33, and the input is performed via the window 51, which is for entering instructions and data. Analytical data are read in from another memory unit when the display apparatus is started up or in response to an instruction from the user, and the data are stored in the data section 53. Viewpoint data for displaying plans also are stored in the data section 53. A drawing plan is drawn in the display window 54 in accordance with the viewpoint data. A plurality of viewpoint data are held in the data section 53 to deal with a case in which a plurality of plans are drawn in the display window.

It should be noted that a viewpoint vector, a view-up vector, the distance between a model and a viewpoint and display range, which are for displaying a plan in the display area, shall all be referred to collectively as "viewpoint data". Rotation, translation, enlargement and reduction of a display model shall all be referred to collectively as a "change in viewpoint". Further, the viewpoint data are matrix data, and a plan is drawn in the display window 54 by performing an operation between the analytical data and a matrix. Accordingly, changing the viewpoint is equivalent to entering data from the instruction/data input window 51 and changing the matrix. With regard to the matrix, appropriate values are set as a default when the apparatus is started up.

Figure 6:
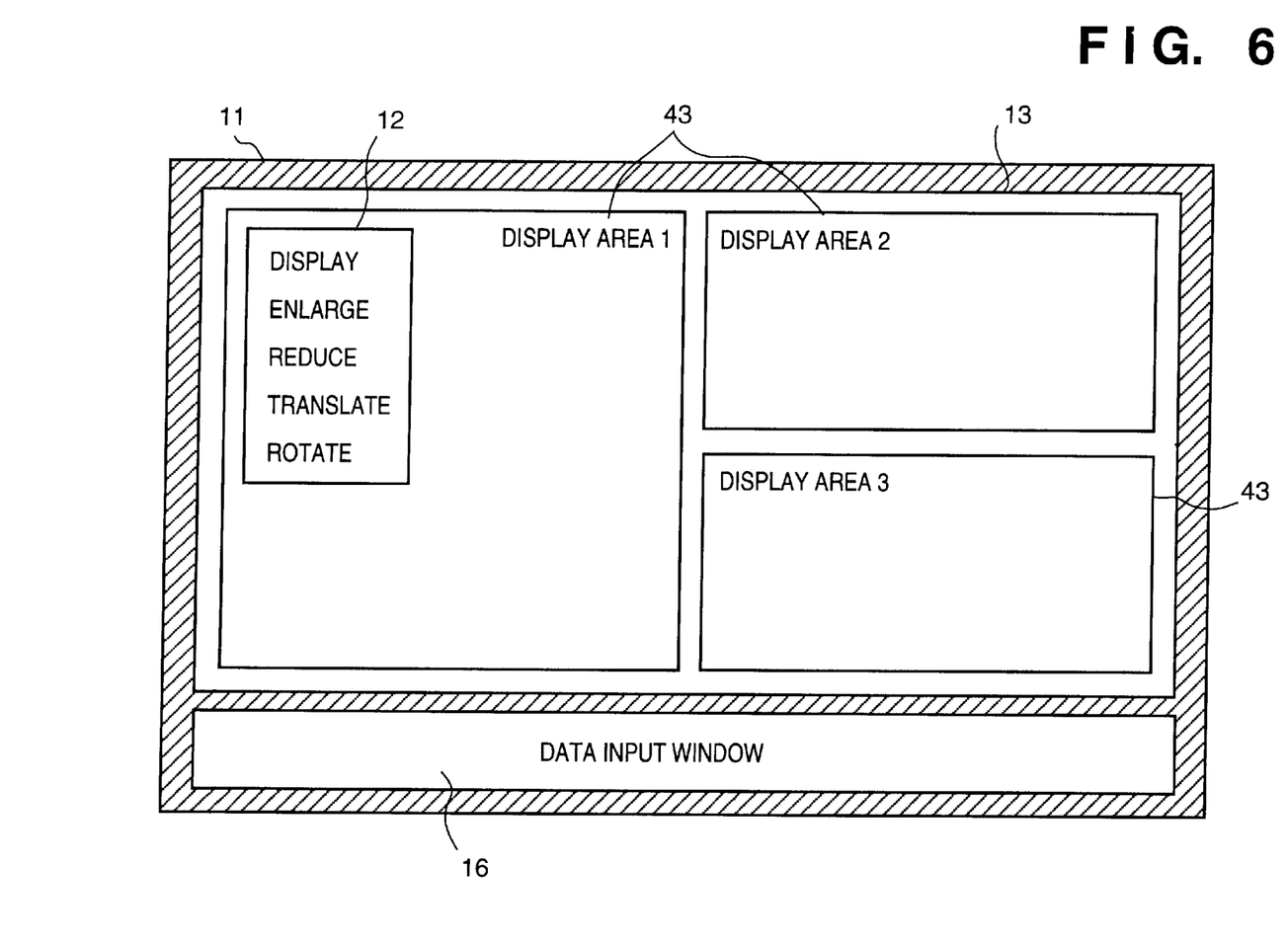
FIG. 6 is a diagram showing a display screen in the analytical data display apparatus according to the prior art.

FIG. 6 illustrates what is presented on a display screen in the analytical data display apparatus according to the prior art. The shaded area 11 is a root window, which is the basic window in X Windows. The root window occupies the entire display area of the display screen and cannot be changed in size or position. Further, new windows can be generated from the root window, and all generated windows are positioned as progeny of the root window. These can be displayed only within the area of the root window.

The user employs the mouse 33 to click on a suitable instruction among instructions displayed in an instruction/selection window 12 and causes the target plan to be displayed. Here a display window 13 is divided into three display areas (1, 2 and 3) 43 in such a manner that three plans can be displayed simultaneously. A data input window 16 is a window for entering data from the keyboard 32. The instruction/section window 12, display window 13 and data input window 16 are positioned as progeny of the root window 11. Here the instruction/section window 12 is displayed on the display window 13. However, the layout of these windows differs depending upon the program and all of the windows, with the exception of the root window, can be changed freely in terms of their position, size and overlap. In an actual apparatus, there are various other windows and instructions besides those mentioned above, but these are not shown here.

A conventional procedure for presenting a display using this display system will now be described. It will be assumed in this example that plans in which the viewpoint is changed by rotating an analytical model are displayed in respective ones of the display windows 1, 2 and 3.

(1) The display areas are set to concur with the number of plans to be displayed. Since three plans are displayed, the three display areas 1, 2 and 3 are set, as illustrated in FIG. 6. In general, a display area is set by using the mouse to click two corners of the display area in the display window.

(2) "DISPLAY" is selected from the instruction/section window 12 by the mouse, and the data input window is used to enter "1" as the number of the display area to be displayed. As a result, a plan of the analytical model according to the present viewpoint data is displayed in the display area 1.

(3) "ROTATE" is selected from the instruction/section window 12 by the mouse and the data input window is used to enter the angle of rotation and "2" as the number of the area to be displayed. As a result, the rotated plan is displayed in the display area 2.

(4) "ROTATE" is selected from the instruction/section window 12 by the mouse and the data input window is used to enter an angle for further rotation and "3" as the number of the area to be displayed. As a result, a further rotated plan is displayed in the display area 3.

It should be noted that the enlargement, reduction and translation of the display model can also be effected by the instruction/section window 12 at the same time. The specific procedures for entering the instructions that change the positions of the viewpoints are multifarious and depend upon the program. These are not of particular important and need not be described here.

The conventional method of displaying analytical data described above has the following disadvantages:

(1) In a case where a plurality of drawing plans are displayed at the same time, the display areas for the individual plans become increasingly smaller as the number of plans increases. In other words, in order to present a display by partitioning the display window 13 into small display areas, each individual display area becomes small if a plurality of plans are displayed simultaneously.

(2) Defining the display areas takes time. In addition, it is difficult to neatly arrange the display areas. As described above, a display area generally is defined by clicking two corners using the mouse. However, since the precise position of the mouse on the screen is not known, the user only defines the display area in terms of a suitable position and size.

(3) Changing the layout of the display areas takes as long time. Three display areas have been defined in FIG. 6. In a case where it is desired to make one of them a little larger, the other two display areas must also be redefined by the user.

(4) In a case where a plurality display areas are defined, painting of the displays takes a lot of time. For example, in step (3) of the display procedure described above, the plans in the display windows all vanish in response to the display instruction, then the plan in display area 1 is re-painted, followed by the painting of the plan in display area 2. The same is true with regard to step (4). In order to paint the plan in one display area, the plans in all of the other display areas are erased and then the plans in all of the other display areas are painted again in accordance with each item of viewpoint information. Thereafter, the plan in the target display area is painted. This is because it is necessary to erase the plans of the preceding screen from the display areas in order to effect painting. This arises from the fact that an erasure of a plan in one display area cannot be carried out independent of the other display area.

(5) It is not easily possible for just one plan among a plurality of displayed plans to be displayed upon temporarily enlarging its display area. In order to enlarge one plan, it is required that the display areas be set again and the plans displayed. In order to subsequently restore the original state, the restoration must begin with setting of the plurality of display areas.

SUMMARY OF THE INVENTION

An object of the present invention is to provide an analytical data display method and apparatus in which the user can readily define a plurality of windows and an analytical model or analytical results can be graphically displayed in each window, thereby making it possible to change the position and size at will.

Another object of the present invention is to provide an analytical data display method and apparatus in which a number of analytical models or analytical results can be readily arrayed through a simple operation.

According to the present invention, the foregoing objects are attained by providing an analytical data display method for graphically displaying analytical models or analytical results on a graphic display, comprising a step of providing a screen of the display with a plurality of independent windows, and a graphical display step of graphically displaying identical analytical models or analytical results from different viewpoints in respective ones of the plurality of independent windows.

The method further includes a step, prior to the graphical display step, of designating a desired window among the plurality of independent windows as a graphics display window. Further, the graphics display window is provided with a display switch for enabling display, and the graphical display step includes a step of setting viewpoint information for the graphics display window whose display switch has been turned on, and a step of displaying a graphic upon transforming information indicative of the analytical model or analytical results based upon the set viewpoint information. The method further includes a step of storing the set viewpoint information in correspondence with the graphics display window.

The method further includes the steps of providing a layout designation window for designating layout of a plurality of graphics display windows, a step of subdividing the layout designation window into a plurality of areas, a step of correlating the plurality of areas and respective ones of the plurality of graphics display windows, and a step of laying out and outputting graphics, displayed in the graphics display windows, based upon the layout designation window.

According to the present invention, the foregoing objects are attained by providing an analytical data display apparatus for graphically displaying analytical models or analytical results on a graphic display, comprising window opening means for opening a plurality of independent windows on a screen of the display in accordance with a window opening instruction, and graphical display means for graphically displaying identical analytical models or analytical results, from viewpoints corresponding to viewpoint information designated with respect to respective ones of the plurality of independent windows, in respective ones of the plurality of independent windows.

The apparatus further includes means which, if a window has been designated as a graphics display window, is for providing the window with a display switch for enabling display, and the graphical display means further includes means for storing viewpoint information in correspondence with the graphics display window whose display switch has been turned on, and means for displaying graphics upon transforming information indicative of an analytical model or analytical results based upon the set viewpoint information.

The apparatus further includes means for opening a window subdivided into a plurality of areas for designating layout of the graphics display windows, and means for laying out and outputting graphics, displayed in the graphics display windows, based upon a correlation between the plurality of areas and respective ones of the plurality of graphics display windows.

By virtue of the construction described above, a plurality of windows having display areas are created, one display area is provided for each display window and each display area is adopted as an independent display area. As a result, it is easy to change the display area of an analytical model or analytical results. This makes it possible to shorten display time and to use the window system efficiently. Furthermore, a window is provided for designating the layout of the plurality of graphics display windows. This makes it possible to easily array many analytical models or analytical results through a simple operation.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described in detail with reference to the drawings.

In this embodiment, the invention is applied to display of a three-dimensional model by meshing for finite elements. However, the invention is also applicable to pre-post processing and graph creation program in other analytical methods.

Example of Construction of Analytical Data Display Apparatus

Figure 1A:
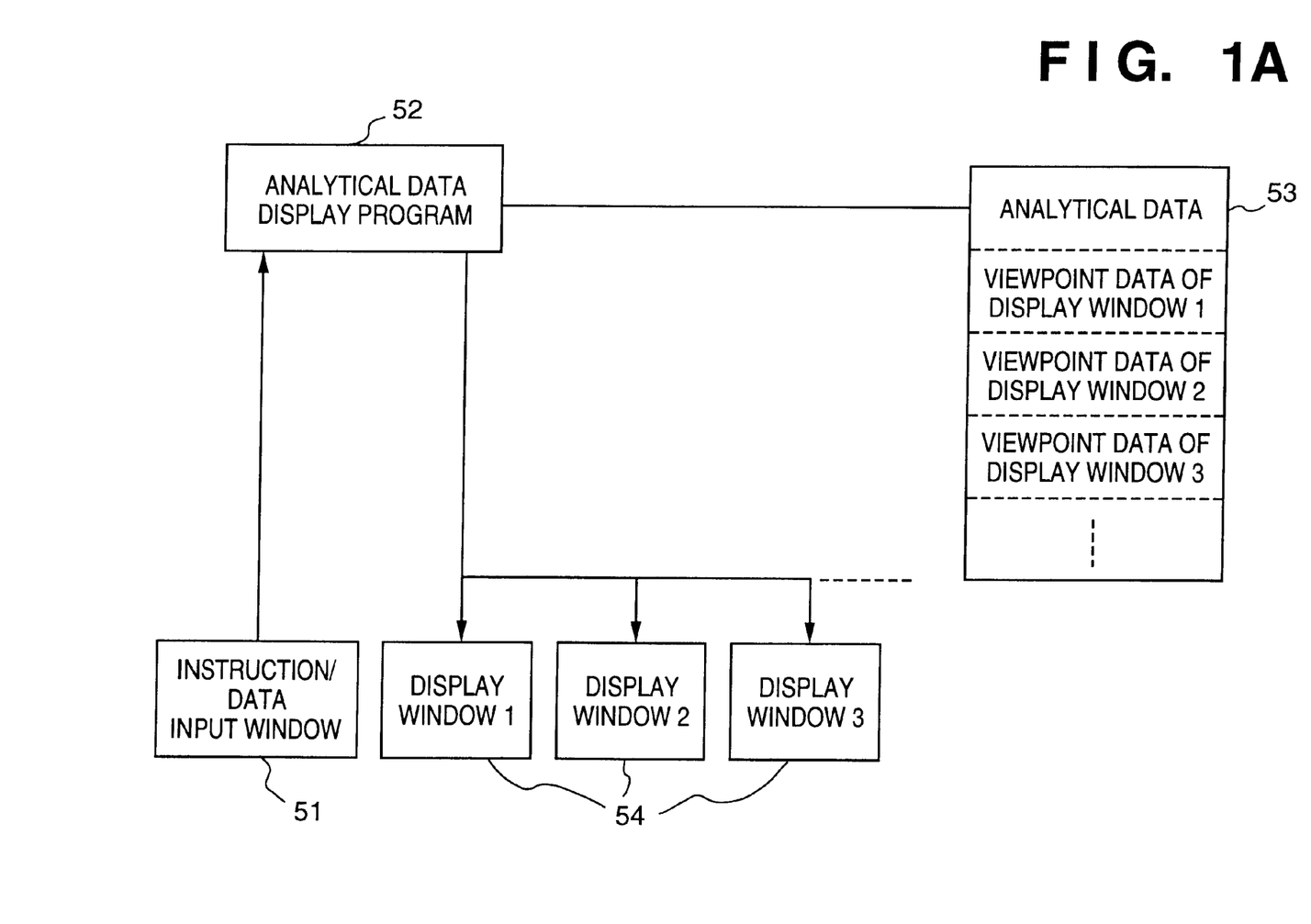
FIG. 1A is a diagram showing the arrangement of a program, data and windows in an embodiment of the present invention.

FIG. 1A illustrates the arrangement of program, data and windows according to this embodiment. As shown in FIG. 1A, the apparatus includes a program 52 for displaying analytical data and data 53. The program 52 and data 53 are stored in the memory of a computer. Windows 51, 54 allow user input/output.

According to this embodiment, a plurality of display windows are provided in order to display a plurality of plans. The display windows 54 are created by the program 52 independently in response to entry of instructions for creating them, the instructions being entered from the window 51, which is for entering instructions and data. Though three display windows 54 have been created in FIG. 1, the number thereof is not limited to three. Viewpoint data for displaying plans have been stored in the data 53 to correspond to each of the display windows 54.

Each display window 54 has only one display area, and the positions and sizes of the display windows can be set freely and they can be overlapped at will.

Figure 1B:
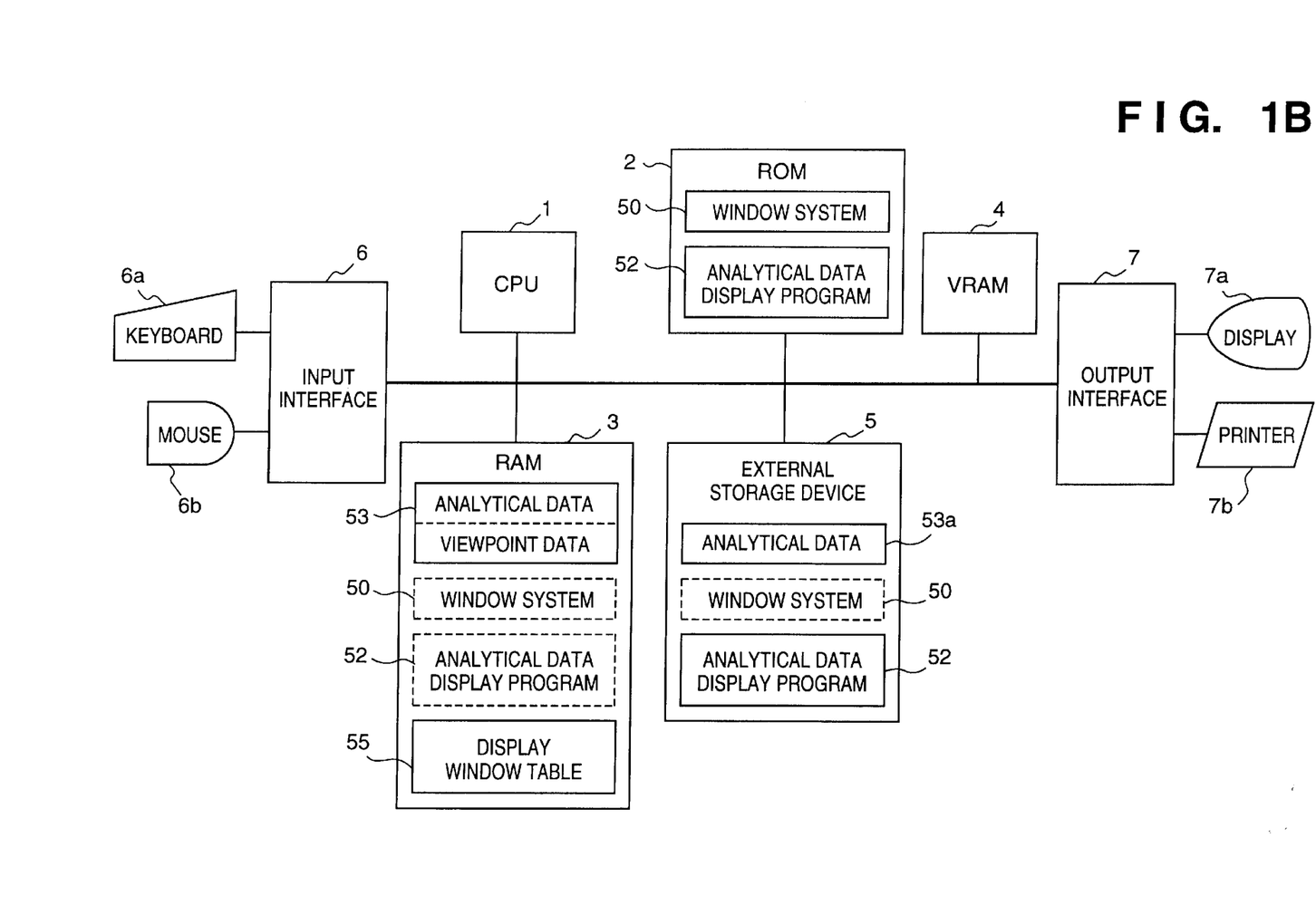
FIG. 1B is a diagram showing an example of a hardware arrangement for implementing the analytical data display apparatus according to this embodiment.

FIG. 1B is a diagram showing an example of a hardware arrangement for implementing the analytical data display apparatus according to this embodiment. As shown in FIG. 1B, a CPU 1 is for performing computations and control, and a ROM 2 stores specific data, processing programs, etc. In a case where the apparatus is made to run a program for implementing the invention, a window system 50 and an analytical data display program 52 are provided stored in the ROM as the processing programs. A RAM 3 is for temporary storage. The RAM 3 stores data 53, which include analytical data to be displayed and viewpoint data corresponding to each display window, and a display window table 55 for storing the states of each of the display windows. The RAM 3 additionally includes an area for storing the window system as a processing program, and an area for storing the analytical data display program as another processing program loaded from an external storage device.

Figure 1C:
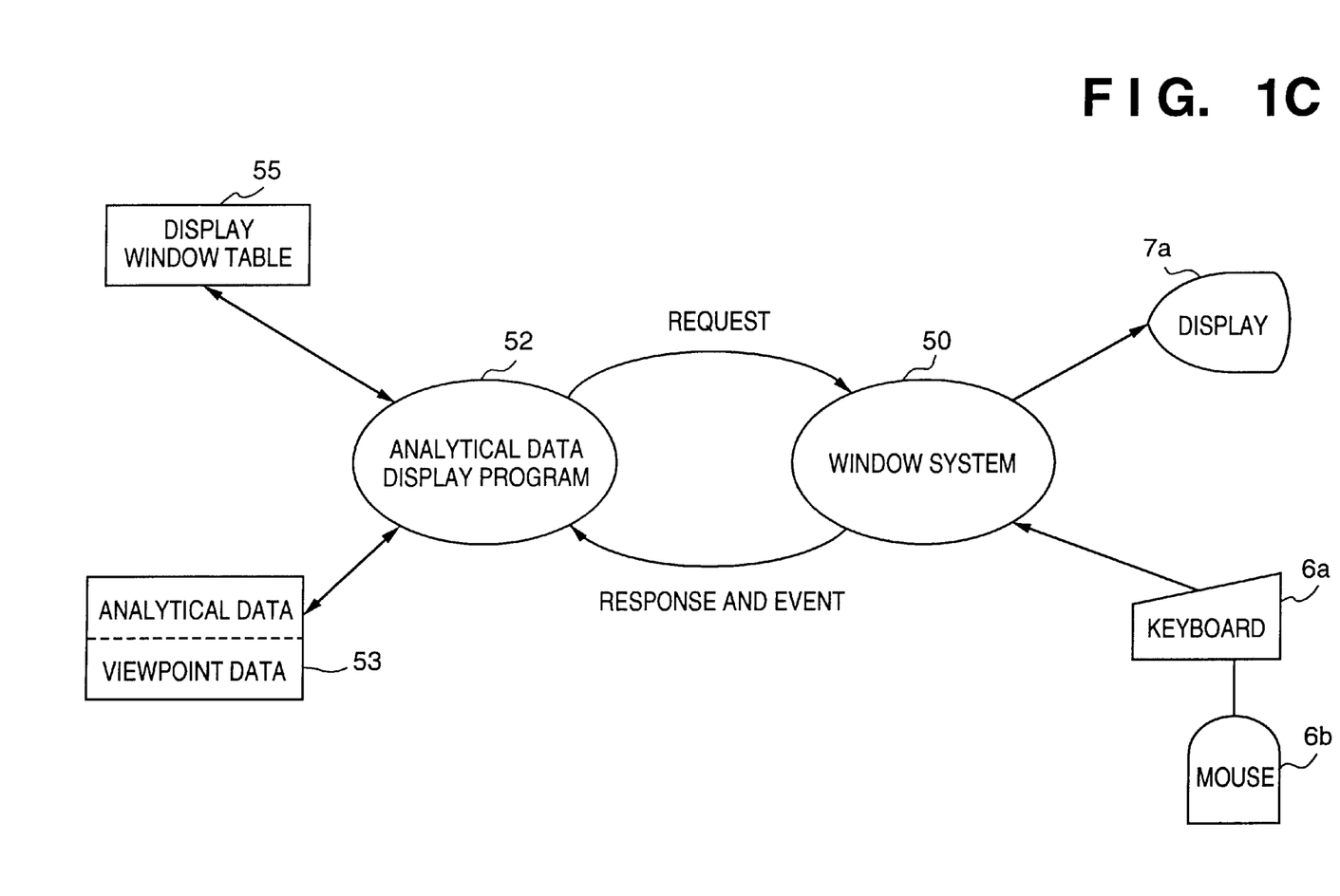
FIG. 1C is a diagram showing an example of the processes used in presenting an analytical data display according to this embodiment.
Figure 1D:
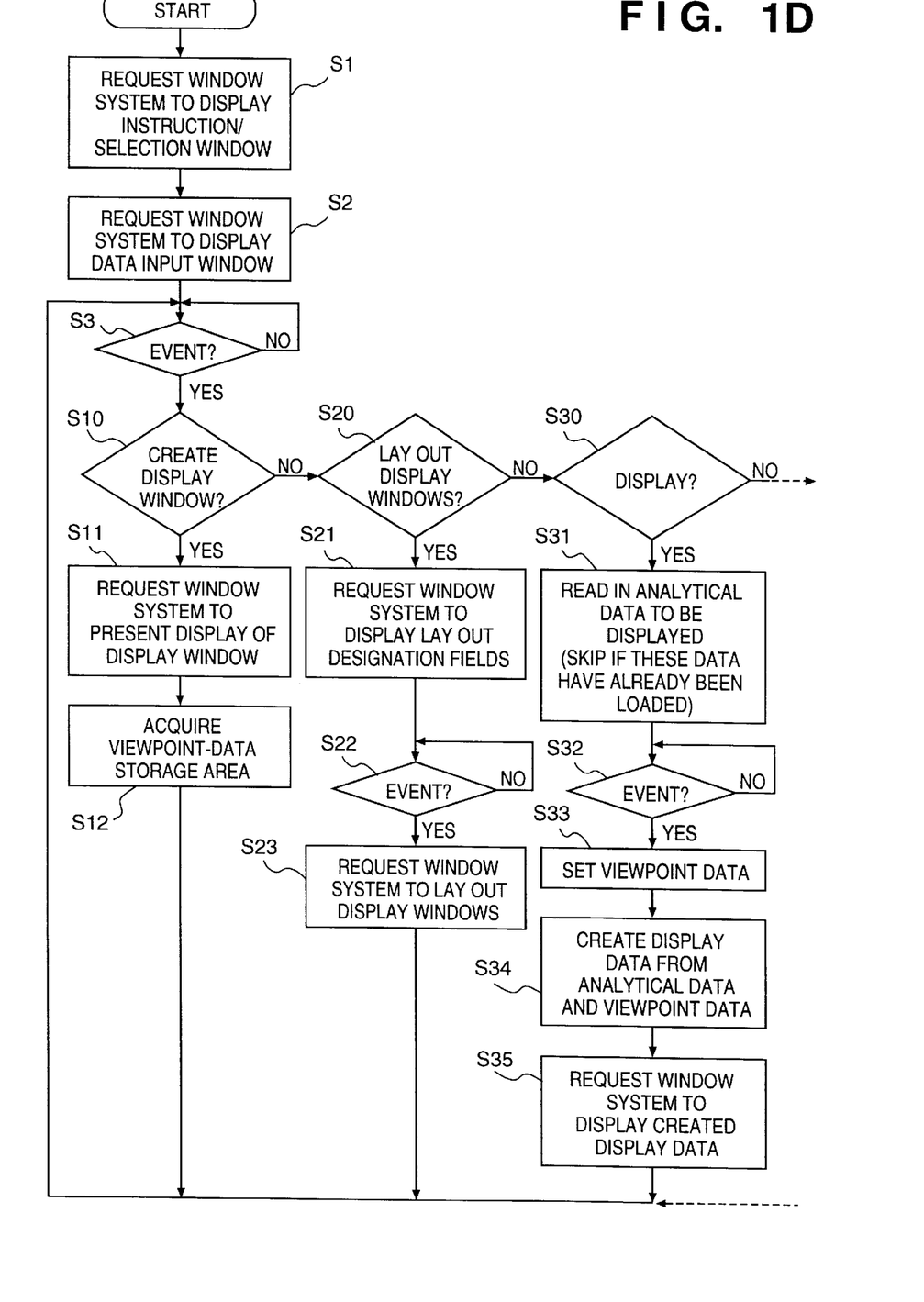
FIG. 1D is a flowchart showing an example of the processing procedure of an analytical data display program according to this embodiment.
Figure 1E:
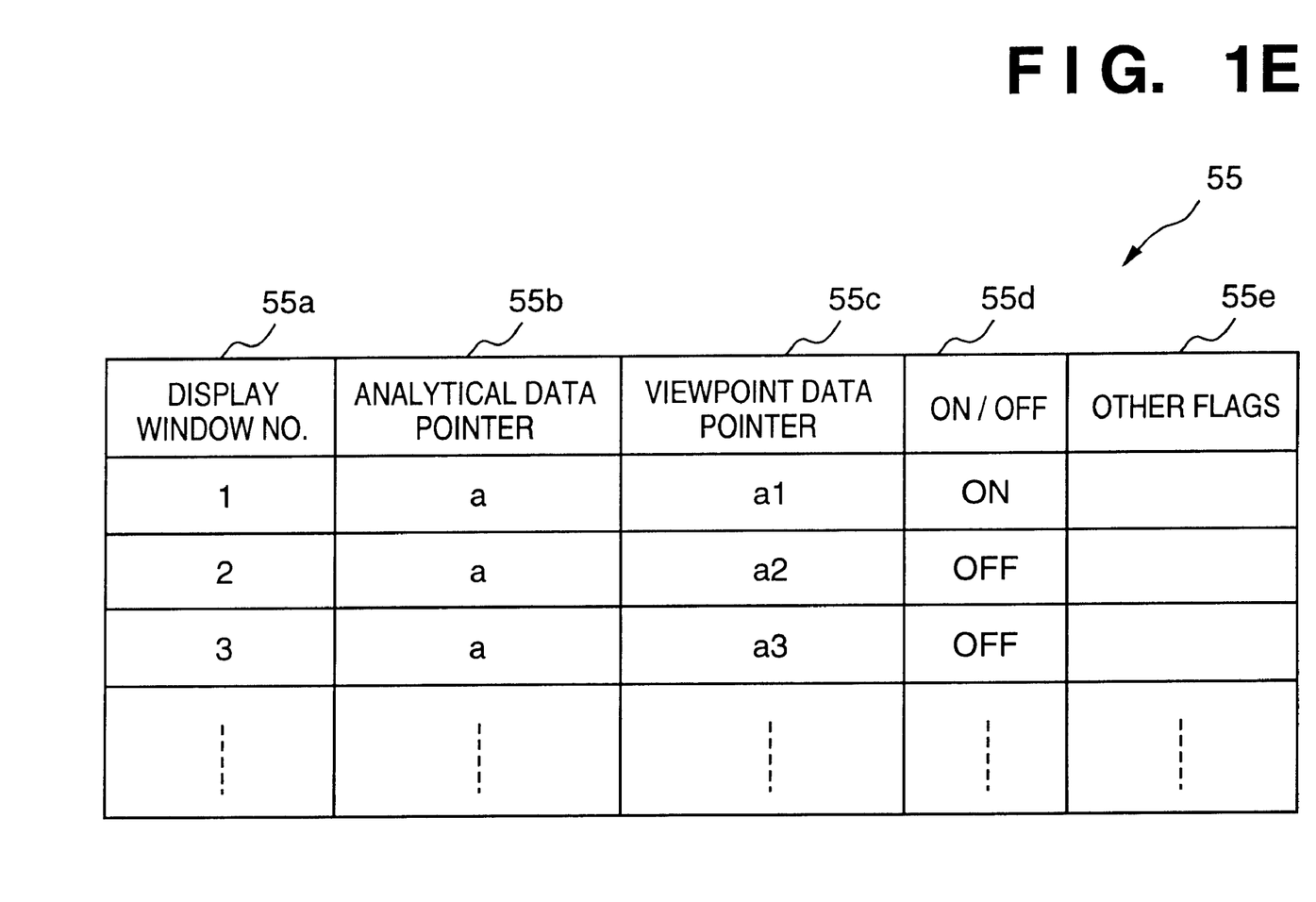
FIG. 1E is a diagram showing an example of the constitution of a painting window table according to this embodiment.

FIG. 1E illustrates an example of the constitution of the display window table 55. This is a table by which the analytical data display program manages the present state of display windows 54. Stored in correspondence with each display window numbers 55a are a pointer 55b to the analytical data displayed by the display window 54, a pointer 55c to the viewpoint data, a display ON/OFF flag 55d and another necessary flag 55e. When the window system 50 is instructed by the user to deliver the data of the table 55 to the analytical data display program 52, the latter updates the data of this table.

With reference again to FIG. 1B, a VRAM 4 stores display data developed in the form of dots. An external storage device 5 such as a floppy disk drive stores analytical data 53a and the analytical data display program 52, which is loaded into the RAM 3 for execution. In a case where the window system is loaded into the RAM 3, the external storage device 5 stores the window system 50 as well.

Figure 1F:
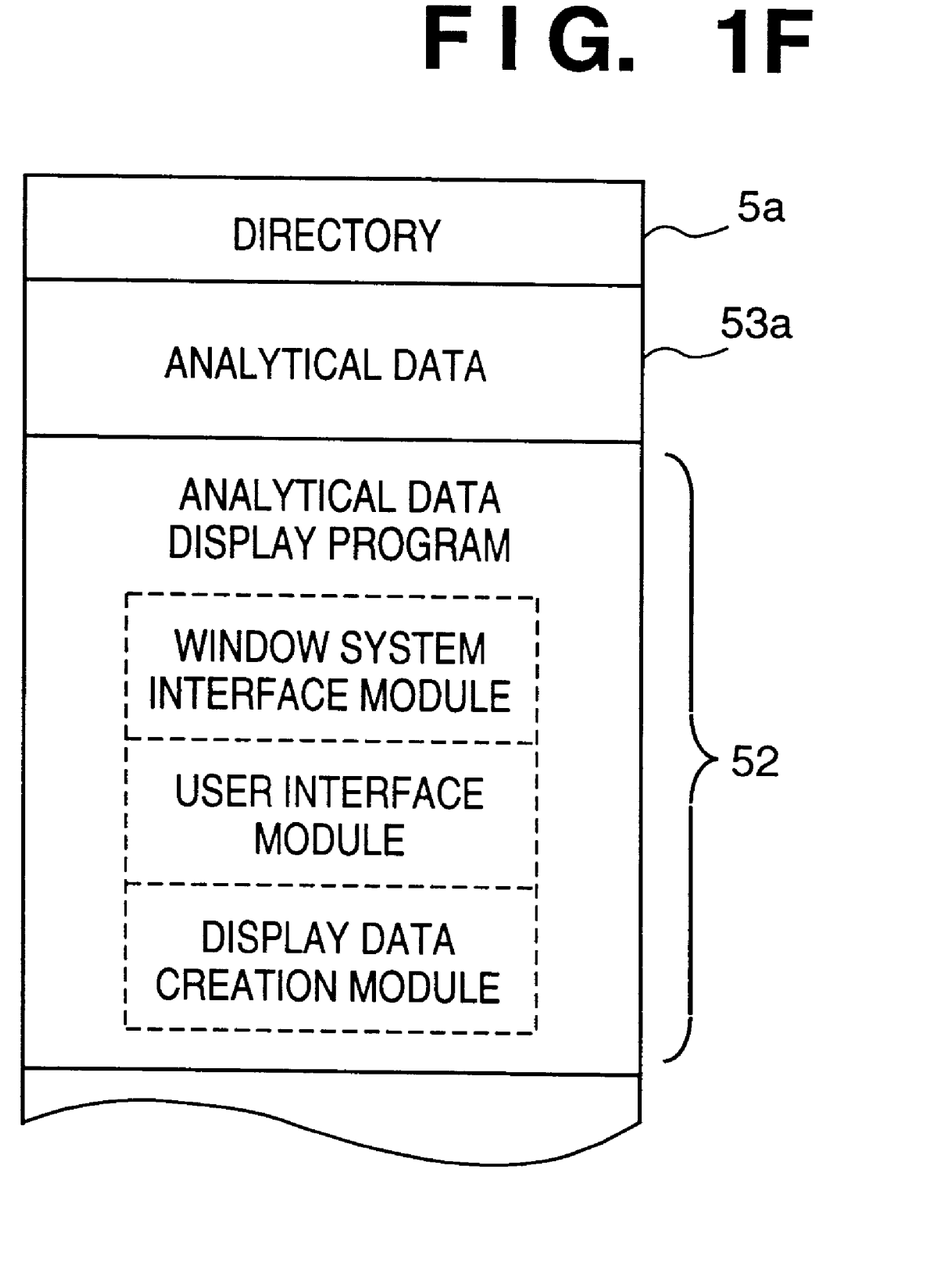
FIG. 1F is a diagram showing an example of the structure of data in an external storage medium according to this embodiment.

FIG. 1F is a diagram showing an example of the structure of the data on the storage medium of the external storage device 5. The external storage device stores a directory 5a, analytical data 53a and the analytical data display program 52, which comprises a window-system interface module for interfacing the window system, a user interface module for analyzing and designating an exchange with the user via the window system, and an analytical data creation module for creating display data displayed in a display window via the window system. It should be noted that this is only one example division of the analytical data display program 52 into modules.

With reference again to FIG. 1B, an input interface 6 is connected to a keyboard 61 and mouse 6b, which allow the user to enter instructions and data. An output interface 7 is connected to a display 7a, such as a CRT or LCD, for displaying data, and to a printer 7b for a hard-copy output.

FIG. 1C is a diagram showing an example of the processes used in presenting an analytical data display according to this embodiment. The display of analytical data is implemented mainly via an exchange between the window system 50 and the analytical data display program 52. The window system 50 manages a direct interface with the user, such as displays on the display 7a, entry of data from the keyboard 6a and mouse 6b, designations, etc. The analytical data display program 52 manages applications for creation of display data from the analytical data and the viewpoint data 53, for designating displays in the window system 50 in accordance with the display window table 55, etc.

For example, in a case where the user designates creation of a new display window, the window system 50 employs a cursor to designate the position of "CREATE DISPLAY WINDOW" in the instruction/selection window 12 (see FIG. 2), senses that the mouse 6b has been clicked and delivers this position information to the analytical data display program 52 as the occurrence of an event. The analytical data display program 52 recognizes the designation of "CREATE DISPLAY WINDOW" from the position information and newly adds a Display Window No. (55a) to the display window table 55.

Next, the analytical data display program 52 requests the window system 50 to open a window. The window system 50 responds to the request by opening a new window and, when opening has been completed, so informs the analytical data display program 52. Upon being so informed, the analytical data display program 52 turns on the ON/OFF flag of the new Display Window No. in the display window table 55 and turning off the other ON/OFF flags. Thus, when the window system 50 receives some instruction from the user, the window system 50 notifies the analytical data display program 52 of this as the occurrence of an event, the content of the instruction is analyzed by the analytical data display program 52, the window system 50 is requested to update the data based upon the results of analysis and the window system 50 changes the display presented. This operation is performed repeatedly.

Example of Processing Procedure Executed by Analytical Data Display Apparatus

FIG. 1D is a diagram showing an example of the processing procedure of the analytical data display program 52 according to this embodiment. It should be noted that the window system 50 is already known in the art and need not be described here. In FIG. 1D, the steps dealing with requests to the window system signify to work upon the window system, and the "event" steps are steps at which notification of an event occurrence (a designation made by the user) from the window system is awaited.

First, the window system is requested to display the instruction/selection window 12 (see FIG. 2) at step S1, the window system is requested to display the data input window 16 at step S2, and an event from the window system is awaited at step S3.

When notification of the occurrence of an event is received from the window system, the content of the event is discriminated from the position designated by the user.

When "CREATE DISPLAY WINDOW" is designated, the program proceeds from step S10 to S11, at which the display window table 55 is updated and the window system is requested to display the display window. Next, at step S12, a storage area for the viewpoint data corresponding to the opened display window is acquired. The program then returns to step S3 to wait for the next event.

Figure 3:
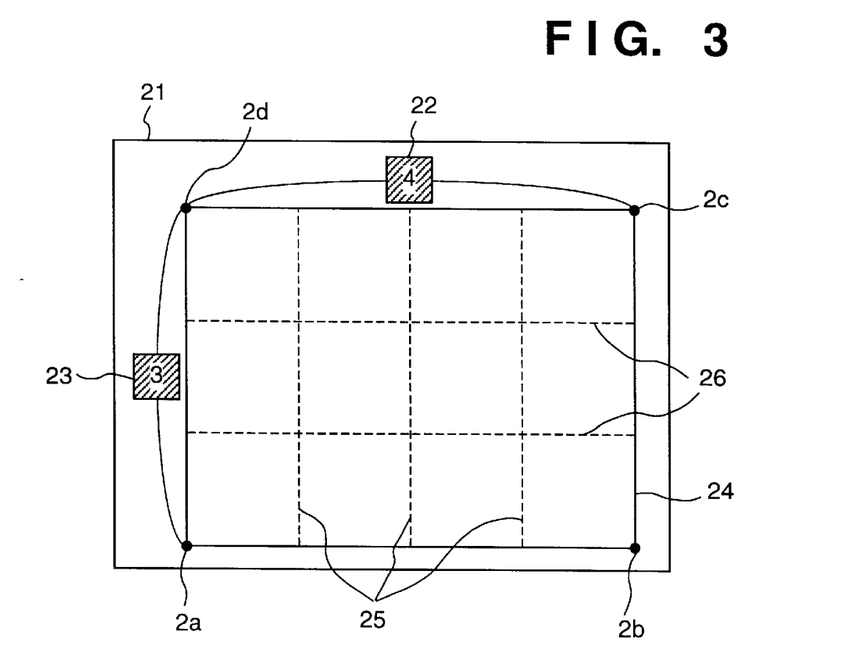
FIG. 3 is a diagram for describing implementation of a painting window arrangement according to this embodiment.

When "LAY OUT DISPLAY WINDOWS" is designated, the program proceeds from step S20 to S21, at which the window system is requested to display layout designation fields (indicated at 22, 23 in FIG. 3). The occurrence of an event is awaited at step S22.

When an event occurs, this is a numerical input to the layout designation fields. Accordingly, the input is accepted. Then, at step S23, the size of each display window is calculated and the window system is requested to effect layout.

When "DISPLAY" is designated, the program proceeds from step S30 to step S31, at which the designated analytical data are read in. It should be noted that the designation of analytical data is entered from the data input display window 16 (see FIG. 2), by way of example. Further, in a case where analytical data desired to be displayed in the display window have already been loaded, step S31 is skipped. A viewpoint-data input event is awaited at step S32. When the viewpoint data are entered, the viewpoint data are written in the storage area, which has been acquired at step S12, in correspondence with this display window at step S33. The display data are calculated and created from the analytical data and viewpoint data at step S34. Next, at step S35, the created display data are displayed in the display window whose display is currently turned on.

It should be noted that other processing for "ENLARGE", "REDUCE", "TRANSLATE" and "ROTATE" can readily be understood from the foregoing description and need not be described here.

Figure 2:
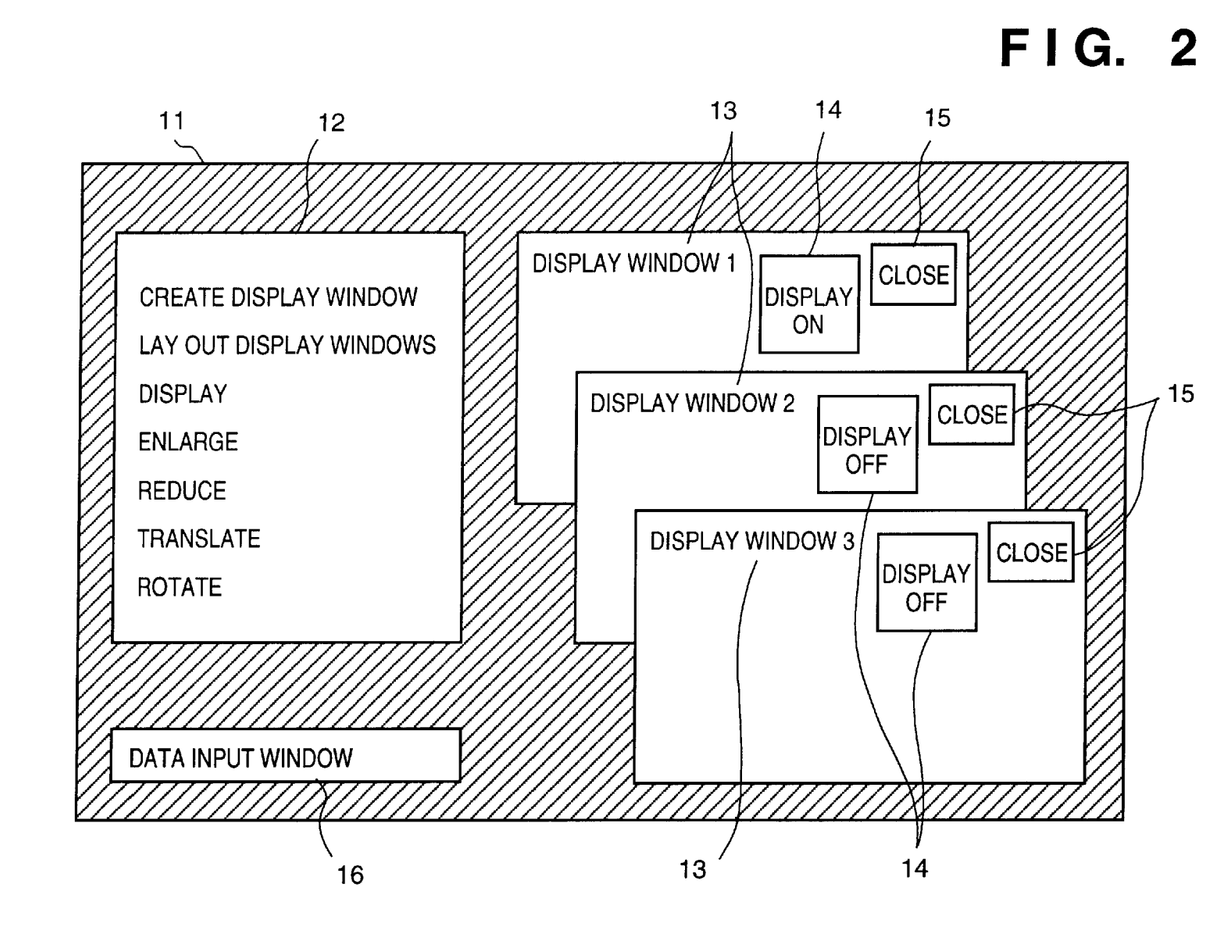
FIG. 2 is a diagram for describing a display screen according to this embodiment.

FIG. 2 is a diagram for describing a display screen. Shown in FIG. 2 are the root window 11, the instruction/selection window 12, the display windows 13 and the data input window 16. These windows are the same as those described in connection with FIG. 6. However, the instruction/selection window 12 has been provided with an instruction for creating a display window and an instruction for laying out display windows in addition to the instructions for painting and changing viewpoint (enlargement, reduction, translation, rotation, etc.). A plurality of the display windows 13 can be created, and one display window possesses only one display area. Each display window 13 is provided with a display switch 14 and a display-window erase switch 15.

The instructions and switches in the instruction/selection window 12 and display windows 13 will now be described.
Example of Instruction/Selection Window Display window creation: Here display windows 13 are created anew. Further, at the same time that a display window 13 is created anew, a memory area for storing viewpoint data is acquired, as in the manner of the data 53 in FIG. 1. It should be noted that there is an upper limit on the number of display windows that can be created. The memory areas which store the viewpoint information may be provided in a number equivalent to the upper limit on the number of display windows. Here instructions are executed three times and three display windows are created.

Display window layout: Here the generated display windows are neatly arranged. When this instruction is selected, the window shown in FIG. 3 for arranging the display windows is displayed. This arrangement window will be described later.
Example of Display Window Display switch: When the display switch 14 reads "DISPLAY ON", this means that the switch has been turned ON by clicking on it using the mouse. In a case where there are a plurality of the display windows, only one display window will be in the ON state. In other words, when a display switch in the OFF state is turned ON by being clicked, the other display switch in the ON state is changes to the OFF state. When the "DISPLAY" instruction has been executed in the instruction/selection window, a display is presented in the ON window.

Window erase switch: When the window erase switch 15, which reads "OFF", is clicked using the mouse, the display window having this vanishes from the screen.
Example of Operation of Analytical Data Display Apparatus An example of actual operation according to this embodiment will now be described. As in the description of the prior art, it will be assumed that three drawing plans of a model are displayed, the model being rotated differently in each plan.

(1) Since three plans are displayed simultaneously, three display windows are created. If the instruction for creating a display window is executed three times, the three display windows shown in FIG. 2 are created.

(2) The sizes of the three created display windows are set appropriately. As mentioned in the description of the prior art, this operation can readily be performed using the basic functions of the window. The positions of the windows and the overlapping thereof need not be taken into account.

(3) From among the three created display windows, the display switch 14 of that display window that is to present a display is turned ON. In the example of FIG. 2, the display switch of display window 1 is turned ON.

(4) "DISPLAY" is clicked on in the instruction/selection window 12. As a result, the model based upon the present viewpoint is displayed in display window 1.

(5) The display switch 14 of the window that is to present a display next is turned ON. Here display window 2 is turned ON.

(6) "ROTATE" is selected from the instruction/selection window 12 by the mouse and an angle of rotation is entered in the data input window 16 using the keyboard. As a result, the plan, which has been rotated through the entered angle, is displayed in display window 3.

(7) The operations (5) and (6) are performed with regard to display window 3. As a result, the plan, which has been rotated further, is displayed in display window 3.

(8) The positions and overlapping of the windows are changed so as to make the displayed plans easy to see.

By virtue of the operation of the apparatus manipulated as described above, three independent plans can be obtained. This embodiment differs from the prior art in that whereas the prior art performs the layout of the display areas at the very beginning, this embodiment allows the positions and overlapping of the display windows to be set last, thereby providing greater flexibility in terms of altering display areas. Further, according to this embodiment, though the size of each window is set before a display is presented, alterations are much easier to perform in comparison with the prior art. As a result, it is possible to set the size of each display window precisely while observing overall balance.

Furthermore, the display windows can be superimposed upon one another. This makes it possible to place an important portion of one plan on an unimportant portion of another so that the display screen can be used more effectively. Adopting this expedient makes it possible to provide the displayed plans with greater diversity so that more effective plans can be created for presentations.

In addition, as mentioned above, viewpoint information is stored separately to correspond to each display window. Therefore, when the viewpoint is changed, it is easy to understand how to make the change. This will now be described in detail in line with the example cited above.

In the above-mentioned operation, assume that a plan obtained by viewing the model from the direction of the Z axis is displayed in display window 1, a plan obtained by rotating the model 30° about its X axis is displayed in display window 2 and a plan obtained by rotating the model a further 30° about its X axis is displayed in display window 3. In a case where a plan obtained by rotating the model a further 30° about its Y axis is displayed, the model is rotated with respect to the plan seen from the direction of the Z axis already being displayed in the display window 1. In other words, rotation, movement, etc., are performed based upon the plans presently being displayed.

Thus, re-display may be performed by taking into account only the viewpoint information of the plans presently being displayed. This affords a system that is very easy to understand. In addition, the amount of memory used is very small even though each display window possesses its own separate viewpoint information. This feature of the invention places almost no constraints upon the system.

In a case where the plan in one display area is to be re-drawn, the fact that only one plan is displayed in one window means that re-drawing may be performed after erasing the previous plan drawn in this window; the plans in the other display windows need not be re-drawn.

In a case where a plurality of plans are displayed on the display screen, it is often desired to enlarge only one of the plans. The method of the present invention makes this easy to carry out. Specifically, the size of the display window desired to be enlarged need only be changed to display the enlarged window. Since viewpoint information is possessed by the display window, re-setting is unnecessary. To restore the original state, the size of the display window is returned to the original state to re-display the window in the original size. This completes the procedure.

It has been stated that one of the plurality of display switches is always in the ON state. However, it may be so arranged that more than one display switch is in the ON state. By turning ON a plurality of display switches, a plurality of display windows can be displayed simultaneously, thereby improving display efficiency.

In accordance with this embodiment, as described above, plans displayed in a plurality of display windows can be arrayed much more easily than in the prior art.

Example of Display Window Layout

The layout instruction for neatly arranging the display windows will now be described.

FIG. 3 is a window, displayed when display window layout is executed, for neatly arranging the display windows. A rectangle 21 denotes a window frame in which a rectangle 24 is an area corresponding to the root window. Points 2a, 2b, 2c and 2d correspond to the lower left, lower right, upper right and upper left corners of the root window. Fields 22 and 23 are used for entering the number of subdivisions of the area 24 in the horizontal and vertical directions, respectively. The rectangular area 24 is partitioned by the dashed lines 25, 26 in accordance with the values entered in the input fields 22, 23. The layout of the display windows is changed using this window for laying out the windows.

The procedure for laying out the display windows will now be described in line with a specific example.

Assume that there are 12 display windows at the present time. These 12 display windows can be arranged to have the same size and without any spaces between them through the following procedure:

(1) "LAY OUT DISPLAY WINDOWS" is selected from the instruction/selection window. When this is done, the window of FIG. 3 for laying out display windows is displayed.

(2) The number of subdivisions is entered in the input fields 22, 23 of FIG. 3. Since 12 display windows are requested, the values "4" and "3" are entered, respectively, as illustrated in FIG. 3. As a result, the screen is equally subdivided horizontally and vertically according to the entered number of subdivisions as indicated by the dashed lines 25, 26 in FIG. 3, whereby lines appear partitioning the screen into 12 areas.

(3) The display window whose position and size are to be changed is selected by turning ON its window display switch 14.

(4) From the 12 subdivided areas shown in FIG. 3, an area whose display window [the window display switch 14 whereof has been turned ON in (3) above] is desired to be laid out is selected and this area is clicked on using the mouse. The program detects the clicked position, changes the size of this display window to one which will fit inside this area and changes the display position so that it will be disposed within the selected area.

(5) The operations of (3) and (4) above are repeated with regard to all 11 of the other display windows.

In accordance with this method, an inconvenience can arise in which, depending upon the number of display windows, the entirety of the screen area of the display cannot be used and the sizes of all windows become the same. However, since the sizes and positions of the windows can be changed in a simple manner after the operation in the same manner as before the change in layout, no particular problems arise.

Further, though the rectangle 24 is made to correspond to the root window as is, the rectangle 24 may be made to correspond to a somewhat smaller rectangular area. By adopting this expedient, the portion surrounding the root window will be displayed and can be clicked on even after all of the display windows have been laid out.

In the above-described embodiment, an example is illustrated in which the invention is applied to display of a model, subdivided by the three-dimensional finite-element method, and to display of results of computation. However, the invention is not limited to the finite-element method and can be applied to pre-post processing and graph creation program in other analytical methods. The method of application would be exactly the same as described in the foregoing embodiment.

The present invention can be applied to a system constituted by a plurality of devices (e.g., host computer, interface, reader, printer) or to an apparatus comprising a single device (e.g., copy machine, facsimile).

According to the present invention, there can be provided an analytical display method and apparatus in which the user can readily define a plurality of windows and an analytical model or analytical results can be graphically displayed in each window, thereby making it possible to change position and size at will.

Further, there can be provided an analytical display method and apparatus in which a number of analytical models or analytical results can be readily laid out through a simple operation.

More specifically, the present invention provides the following effects so that a designer can readily display a plurality of plans on a single display screen and compare the plans.

(1) Even if a plurality of plans are displayed simultaneously, the plans can be displayed in overlapping fashion. This makes it possible to minimize the rate of the reduction in size of each plan.

(2) Defining display areas is very easy.

(3) Changing the layout of display areas can be performed with ease and it is easy to neatly arrange the areas.

(4) When there are a plurality of plans, it is possible to re-draw any one of the plans in a short period of time.

(5) Changing the size of a plan can be performed easily by changing the size of the window. It is also easy to temporarily enlarge and display one of a plurality of plans.

(6) Since each window has its own viewpoint information, it is easier to understand how to change the viewpoint.

The object of the present invention is achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiment are realized by executing the program codes which are read by a computer, the present invention includes a case where an OS (Operating System) or the like working on the computer performs a part or entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiment.

In a case where the present invention is applied to the aforesaid storage medium, the storage medium stores program codes corresponding to the flowchart described in the embodiment. Briefly, the storage medium stores each module shown as an example of a memory map in FIG. 1F. More specifically, program codes which correspond to window system interface module, user interface module, and display data creation module, at least, are to be stored in the storage medium.

As many apparently widely different embodiments of the present invention can be made without departing from the spirit and scope thereof, it is to be understood that the invention is not limited to the specific embodiments thereof except as defined in the appended claims.

What is claimed is:

1. An analytical data display method comprising the steps of:

storing a plurality of viewpoints from which a three-dimensional shaped model is viewed into a storage means in accordance with windows to be used for drawing image data respectively corresponding to the plurality of viewpoints;

providing a window to be used for drawing image data; and drawing image data obtained by viewing the three-dimensional shaped model from a viewpoint in the provided window, based on the viewpoint stored in the storage means in accordance with the provided window.

2. The method according to claim 1, further comprising the step of controlling the drawing so as to draw image data in a window whose drawing switch capable of switching whether or not image data is drawn in the window has been turned on or not to draw image data in a window whose drawing switch has been turned off.

3. The method according to claim 1, further comprising the step of designating a window to be provided in a plurality of windows, wherein the step of providing a window provides the designated window.

4. The method according to claim 1, further comprising the steps of:

changing a viewpoint stored in accordance with the window to be used for drawing image data; and redrawing image data in the window based on the changed viewpoint.

5. The method according to claim 2, wherein the drawing switch is a soft-switch in a window to be used for drawing image data on a display screen.

6. An analytical data display apparatus comprising:

storage means for storing a plurality of viewpoints from which a three-dimensional shaped model is viewed in accordance with windows to be used for drawing image data respectively corresponding to the plurality of viewpoints;

window opening means for opening a window to be used for drawing image data; and drawing means for drawing image data obtained by viewing the three-dimensional shaped model from a viewpoint in the opened window, based on the viewpoint stored in the storage means in accordance with the opened window.

7. The apparatus according to claim 6, further comprising a drawing switch for switching whether or not image data is drawn in the window drawing, and drawing control means for controlling said drawing means so as to draw image data in a window whose drawing switch has been turned on or not to draw image data in a window whose drawing switch has been turned off.

8. The method according to claim 6, further comprising designating means for designating a window to be provided in a plurality of windows, wherein said window opening means opens the designated window.

9. The apparatus according to claim 6, further comprising changing means for changing a viewpoint stored in accordance with the window to be used for drawing image data, and redrawing means for redrawing image data in the window based on the changed viewpoint.

10. The apparatus according to claim 7, wherein said drawing switch is a soft-switch in a window to be used for drawing image data on a display screen.

11. A storage medium storing a computer-readable program for displaying analytical data, said computer-readable program performing the steps of:

storing a plurality of viewpoints, from which a three-dimensional shaped model is viewed, into a storage means in accordance with windows to be used for drawing image data respectively corresponding to the plurality of viewpoints;

providing a window to be used for drawing image data; and drawing image data obtained by viewing the three-dimensional shaped model from a viewpoint in the provided window, based on the viewpoint stored in the storage means in accordance with the provided window.

12. The storage medium according to claim 11, with the computer-readable program further performing the step of controlling the drawing so as to draw image data in a window whose drawing switch capable of switching whether or not image data is drawn in the window has been turned on or not to draw image data in a window whose drawing switch has been turned off.

* * * * *

UNITED STATES PATENT AND TRADEMARK OFFICE
CERTIFICATE OF CORRECTION

PATENT NO. : 5,914,715

DATED : June 22, 1999

INVENTOR(S) : Sasaki

It is certified that error appears in the above-identified patent and that said Letters Patent is hereby corrected as shown below:

On the title page, item
[56] REFERENCES CITED:

FOREIGN PATENT DOCUMENTS, "0 558 224  9/1993  European Pat. Off. ..... G06F 3/033" should be deleted.

COLUMN 14:

Line 22, "method" should read --apparatus--.

Signed and Sealed this

Twentieth Day of June, 2000

Attest:

Q. TODD DICKINSON

*Attesting Officer*       *Director of Patents and Trademarks*